(12) United States Patent
Ranade

(10) Patent No.: US 10,618,398 B2
(45) Date of Patent: Apr. 14, 2020

(54) TRANSMISSION SYSTEM FOR VEHICLES

(71) Applicant: Atul Ranade, Navi Mumbai (IN)

(72) Inventor: Atul Ranade, Navi Mumbai (IN)

(\*) Notice: Subject to any disclaimer, the term of this patent is extended or adjusted under 35 U.S.C. 154(b) by 394 days.

(21) Appl. No.: 15/563,844

(22) PCT Filed: Apr. 16, 2016

(86) PCT No.: PCT/IB2016/052187
§ 371 (c)(1),
(2) Date: Oct. 2, 2017

(87) PCT Pub. No.: WO2016/170458
PCT Pub. Date: Oct. 27, 2016

(65) Prior Publication Data
US 2018/0257474 A1  Sep. 13, 2018

(30) Foreign Application Priority Data
Apr. 21, 2015  (IN) .................. 1627/MUM/2015

(51) Int. Cl.
*B60K 6/36*  (2007.10)
*B60K 6/40*  (2007.10)
(Continued)

(52) U.S. Cl.
CPC .......... *B60K 6/36* (2013.01); *B60K 6/40* (2013.01); *B60K 6/442* (2013.01); *B60K 6/52* (2013.01);
(Continued)

(58) Field of Classification Search
CPC ............ B60K 6/36; B60K 6/442; B60K 6/40
See application file for complete search history.

(56) References Cited

U.S. PATENT DOCUMENTS 6,506,139 B2 *  1/2003  Hirt .................. B60K 6/365
                                                    477/3
2010/0023230 A1 * 1/2010 Holmes ............... B60K 6/36
                                                   701/51
(Continued)

FOREIGN PATENT DOCUMENTS

DE    102011005561 A1    9/2012
DE    202013105062 U1    2/2015
(Continued)

*Primary Examiner* — Terence Boes
(74) *Attorney, Agent, or Firm* — Ditthavong & Steiner, P.C.

(57) ABSTRACT

A transmission system (100) for vehicles comprising at least one set of plurality of input shafts (110 & 116) disposed concentrically and having an exposed portion; clutch means (108 & 114) at one end of the input shafts for connecting the input shafts to power sources; an output shaft (118) in communication with the input shafts for conveying the power to set of wheels; input gears (102 & 104) arranged in spaced parallel disposition on the exposed portion of the input shafts; dog clutch means (124 & 126) disposed between the input gears for locking the input shafts to respective input gears; and plurality of drive gears (120) arranged in spaced parallel disposition on the output shaft (118) for engaging in drive relation with the input gears, where the drive gears are configured to transmit power to the output shaft from the input shafts by means of the input gears.

18 Claims, 5 Drawing Sheets

(51) Int. Cl.
  *B60K 6/442* (2007.10)
  *B60K 6/52* (2007.10)
  *F16H 3/00* (2006.01)
  *F16H 37/06* (2006.01)
  *B60K 6/547* (2007.10)

(52) U.S. Cl.
  CPC .............. *B60K 6/547* (2013.01); *F16H 3/006* (2013.01); *F16H 37/065* (2013.01); *Y02T 10/6234* (2013.01); *Y02T 10/6265* (2013.01)

(56) References Cited

U.S. PATENT DOCUMENTS

| | | | |
|---|---|---|---|
| 2010/0132492 A1* | 6/2010 | Holmes | B60K 6/405 74/331 |
| 2011/0009235 A1* | 1/2011 | Song | B60K 6/36 477/3 |
| 2011/0094809 A1 | 4/2011 | Poschmann et al. | |
| 2011/0230298 A1 | 9/2011 | Salamandra et al. | |
| 2011/0306456 A1 | 12/2011 | Mellet et al. | |
| 2012/0004063 A1* | 1/2012 | Koyama | B60K 6/36 475/5 |
| 2012/0006152 A1 | 1/2012 | Fuechtner | |
| 2014/0190309 A1* | 7/2014 | Moosmann | B60K 6/387 74/665 F |
| 2015/0040705 A1 | 2/2015 | Robinette | |
| 2015/0375736 A1* | 12/2015 | Kaltenbach | B60K 6/442 477/5 |
| 2018/0022207 A1* | 1/2018 | Eo | B60K 6/36 74/661 |
| 2019/0270374 A1* | 9/2019 | Hummel | F16H 3/093 |

FOREIGN PATENT DOCUMENTS

| | | |
|---|---|---|
| DE | 102013015982 A1 | 3/2015 |
| EP | 2505410 A1 | 10/2012 |
| EP | 2669547 A1 | 12/2013 |

\* cited by examiner

TRANSMISSION SYSTEM FOR VEHICLES

CROSS-REFERENCES TO RELATED APPLICATIONS

This application claims priority from a PCT Application Serial No. PCT/IB2016/052187, entitled "TRANSMISSION SYSTEM FOR VEHICLES," filed on Apr. 16, 2016, which claims priority from an Indian Patent Application Serial No. 1627/MUM/2015, entitled "TRANSMISSION SYSTEM FOR VEHICLES," filed on Apr. 21, 2015, the contents of which are hereby incorporated herein in their entirety by this reference.

FIELD OF INVENTION

The present invention relates to a transmission system for hybrid vehicles.

BACKGROUND OF THE INVENTION

In the recent years, hybrid vehicles have gained traction given to their merits of reducing exhaust gas emissions and improving the vehicles' fuel efficiency. These vehicles thereby help at reducing the carbon foot print by vehicles.

A variety of transmissions have been designed specifically for the hybrid vehicles, with the aim to make the vehicle more efficient for fuel consumption and performance. However, a majority of the typical transmission systems are developed for a niche segment of high-end buyers.

A typical transmission system for a hybrid vehicle comprises an internal combustion engine (ICE) and an electric motor/generator. These transmission systems use similar technology as the ICE driven cars, in which the transmission takes a single input and provides output to the wheels. These vehicles are also commonly known as mild hybrids since the electric motor is of a small capacity. The motor is placed between the engine and the transmission being adapted to add its torque to that of the engine. The combined torque is transmitted to the wheels from the transmission through a differential.

U.S. Pat. No. 5,943,918 discloses one such hybrid powertrain system. The system comprises an internal combustion engine, a transmission including a transmission drive shaft coupled to the internal combustion engine and a transmission driven shaft driven at a plurality of gear ratios, and an electric motor/generator engaged with the transmission drive shaft for synchronizing rotation of the drive shaft with the driven shaft during the shifting of the transmission.

These transmission systems require that the ICE and the electric motor run at the same RPM. This is a compromising design since both the ICE and the electric motor generate their maximum torques at different RPM's. Thus, in this working either the engine or the electric motor can achieve the maximum torque.

Also, the brake energy regeneration is not achieved over a wide range of speeds resulting in limited recharging of the batteries when brakes are applied. The same limitation occurs when the batteries need to be charged while cruising on the ICE. Since, the ICE and the electric motor are running at the same RPM, the speed of the electric motor also drops to lower RPM when the transmission is engaged at higher gears, thereby reducing the efficiency of recharging the batteries. Hence, the said arrangement provides less flexibility in operation.

Another type of transmission system, known as the e-CVT transmission has been developed for full-hybrid or plug-in hybrid vehicles. The said transmission system comprises an ICE and two electric motors. The electric motors are of a higher capacity to drive the car at longer distances. These transmission systems use a power split device, such as a planetary gear set, which is connected to the ICE and the electric motors.

U.S. Patent Application No. 20140378259 discloses one such transmission system for a hybrid electric vehicle. The transmission system comprises an input shaft connected to an engine; first and second motors/generators on a transmission housing; a first planetary gear set on the input shaft having one rotation element connected to the transmission housing, another rotation element connected to the first motor/generator, and the third rotation element connected to the input shaft; and a second planetary gear set on the input shaft having one rotation element connected to the transmission housing, another rotation element is connected to the second motor/generator, and the third rotation element connected to an output gear.

The electric motors are controlled by use of power electronics for generating different torques for driving the vehicle. In such transmissions generally the ICE kicks in at higher speeds irrespective of the actual power needed.

Further, in this case the ICE and the electric motor have to work in tandem, and the transmission cannot be handled by the electric motor or the ICE alone. Further, in the said arrangement two electric motors are to be provided for the transmission to function. Another limitation of these transmissions is the mode used to regenerate the braking energy. The brake energy regeneration is possible only within a small range of vehicle speed. Also, it is not feasible to turn on the ICE for achieving the brake energy regeneration over a broader speed range.

Similar limitations are present in the typical transmission systems used in electric vehicles. Also, the complexities present in both these designs hinder large scale manufacturing, thereby increasing the cost of manufacturing. To be able to fully exploit the advantages of the technology of hybrid vehicles and electric vehicles, it is required to develop a transmission system which overcomes the aforementioned drawbacks of the known transmission systems, and which is compatible with a variety of vehicles, including hybrid vehicles and electric vehicles.

SUMMARY OF THE INVENTION

It is an object of the present invention to provide a transmission system for a hybrid vehicle having the advantage of operating the engine and the electric motor/generator independently, thereby, providing a cumulative torque to the transmission.

It is another object of the present invention to provide a transmission system for a hybrid vehicle which offers seamless switching between the engine and the electric motor/generator.

It is yet another object of the present invention to provide a transmission system for a hybrid vehicle which gives brake energy regeneration over a wide range of speeds.

It is an additional object of the present invention to provide a transmission system for a hybrid vehicle which is economical, efficient, and conserves fuel.

Other objects and advantages of the present invention will be more apparent from the following description when read in conjunction with the accompanying figure, which is not intended to limit the scope of the present invention.

Accordingly, the present invention discloses a transmission system for vehicles, said transmission system comprising:

at least one set of plurality of input shafts for receiving power from a power source, said plurality of input shafts being concentrically disposed one within the other with the inner shafts extending with respect to the outer shafts to expose at least a portion of each of said input shafts;

clutch means provided at one end of said input shafts for selectively connecting said input shafts to the power source;

at least one output shaft provided in operative communication with said input shafts for conveying a power output from the transmission to at least one set of wheels;

at least one input gear arranged in spaced parallel disposition on the exposed portion of each of said input shafts, each of said input gears having a different pitch diameter for constituting the transmission gear ratios;

dog clutch means disposed on the exposed portion of each of said input shafts and configured for locking selectively each of said input shafts to its respective input gears; and plurality of drive gears arranged in spaced parallel disposition on said output shaft for operatively engaging in drive relation with said input gears, said drive gears being configured to transmit power to said output shaft from said input shafts by means of said input gears;

wherein, when power is transmitted through any of said plurality of input shafts to its respective input gear, said dog clutch means are adapted to lock at least two input shafts with its respective input gears thereby preparing said transmission for a consecutive gear shift.

In accordance with the present invention, said power source includes at least one source selected from internal combustion engine, electric motor, fuel cell, compressed air engine, high mass flywheel, and the like.

Typically, in accordance with the present invention, at least one input shaft has journalled thereon more than one input gears having different pitch diameters, each of said input gears operatively engaging with one of said drive gears.

Preferably, in accordance with the present invention, each drive gear has a different pitch diameter.

More preferably, in accordance with the present invention, the power source is operatively connected to the set of wheels by a clutch unit via a differential arrangement.

Additionally, in accordance with the present invention, a planetary gear set is provided between the power source and said clutch means for adjusting the power to said input shafts.

Alternatively, in accordance with the present invention, plurality of gear elements are provided between the power source and said input shafts for transmitting a gear revolution speed to said input shafts. Preferably, in accordance with the present invention, said plurality of gear elements comprise at least one set of two or more gear wheels operatively engaging by a gear tooth arrangement. Additionally, a clutch unit is provided for selectively discontinuing the transmitting of power from said plurality of gear elements.

Preferably, in accordance with the present invention, additional clutch means are provided at one end of said output shaft for selectively engaging said transmission system.

Additionally, in accordance with the present invention, an auxiliary power source is provided for transmitting additional power directly to the set of wheels. Typically, in accordance with the present invention, said auxiliary power source is arranged in a series disposition with respect to said transmission system.

In accordance with the present invention, a differential arrangement is provided for transmitting the power to the set of wheels from at least one means selected from said transmission system and said auxiliary power source.

Preferably, in accordance with the present invention, independent power sources drive each set of the drive wheels.

Alternatively, in accordance with the present invention, at least one of said input shafts is adapted to transmit power to at least one set of wheels.

BRIEF DESCRIPTION OF THE ACCOMPANYING DRAWINGS

The invention will now be described with the help of the following drawings, in which, FIG. 1 illustrates a schematic of a preferred embodiment of the transmission system in accordance with the present invention;

DETAILED DESCRIPTION OF THE INVENTION

Figure 1:
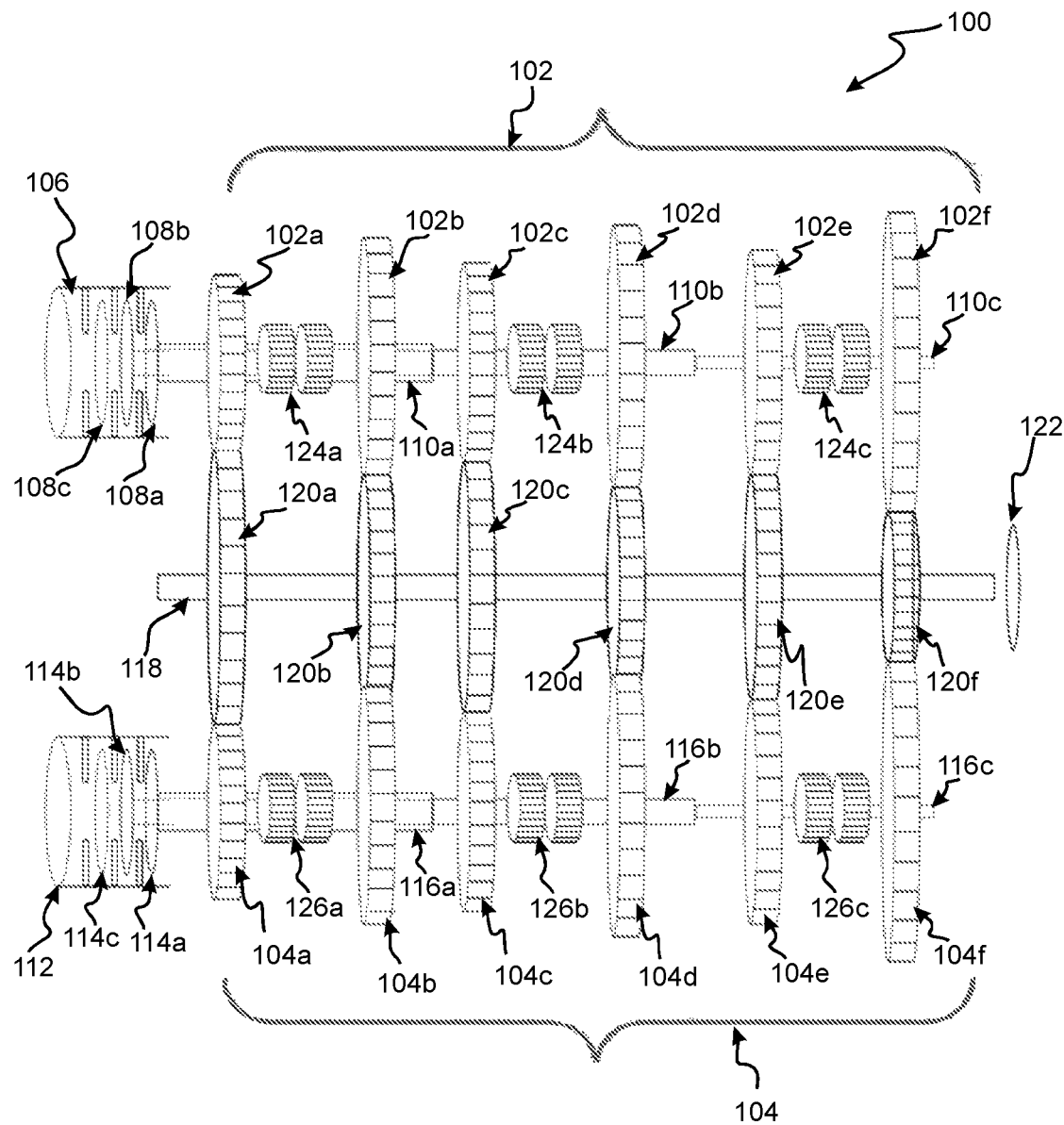

The embodiments herein and the various features and advantageous details thereof are explained with reference to the non-limiting embodiments in the following description. The examples used herein are intended merely to facilitate an understanding of the ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present invention envisages a transmission system for vehicles. The transmission system in accordance to the present invention comprises at least one set of plurality of input shafts for receiving power from a power source. The power source is at least one source selected from internal combustion engine, electric motor, fuel cell, compressed air engine, high mass flywheel, and the like. The power source is operatively connected to the set of wheels by a clutch unit via a differential arrangement.

The plurality of input shafts are concentrically disposed one within the other with the inner shafts extending with respect to the outer shafts to expose at least a portion of each of the input shafts. A clutch means is provided at one end of the input shafts for selectively connecting the input shafts to the power source. The transmission system comprises at least one output shaft provided in operative communication with the input shafts for conveying a power output from the transmission to at least one set of wheels. The output shaft is typically arranged substantially parallel to the input shafts.

The transmission system comprises at least one input gear arranged in spaced parallel disposition on the exposed portion of each of the input shafts. At least one of the input shafts has journalled thereon more than one input gears. The input gears have different pitch diameters for defining the transmission gear ratios. The transmission system includes dog clutch means disposed on the exposed portion of each of the input shafts. The dog clutch means are configured to lock selectively each of the input shafts to its respective input gears. The transmission system further includes plurality of drive gears arranged in spaced parallel disposition on the output shaft. Typically, each of the drive gears may have a different pitch diameter. The plurality of drive gears are adapted to operatively engage in drive relation with the input gears. The drive gears are thus configured to transmit power to the output shaft from the input shafts by means of the input gears.

The transmission system of the present invention is so designed that when the power is transmitted through any of the plurality of input shafts to its respective input gear, the dog clutch means are adapted to lock at least two input shafts with its respective input gears thereby preparing the transmission for a consecutive gear shift. The gear shift typically includes an upward gear shift and a downward gear shift.

The transmission system includes additional clutch means which are disposed at one end of the output shaft. The additional clutch means are configured to selectively engage and disengage the transmission system from the set of wheels. Thus, the transmission system is disconnected when the additional clutch means are disengaged. Preferably, an auxiliary power source is provided for transmitting additional power directly to the set of wheels. More preferably, the auxiliary power source is arranged in series with respect to the transmission system in such manner that even when the transmission system is disengaged power can be transmitted to the set of wheels by the auxiliary power source. A differential arrangement is typically provided for transmitting the power to the set of wheels from the transmission system and the auxiliary power source.

The transmission system of the present invention can be configured in such manner that independent power sources drive each set of the drive wheels. Also, any of the plurality of input shafts can be adapted to act as output shaft to transmit power to any of the set of wheels.

Additionally, the transmission system of the present invention may comprise a planetary gear set. The planetary gear set may be provided between the power source and the clutch means present at the end of the plurality of input shafts for adjusting the power to said input shafts.

In another embodiment, the transmission system of the present invention may comprise a plurality of gear elements. The plurality of gear elements may be provided between the power source and the plurality of input shafts for transmitting a gear revolution speed to the input shafts. The plurality of gear elements comprise at least one set of two or more gear wheels operatively engaging by a gear tooth arrangement. A clutch unit may be provided for selectively discontinuing the transmission of power from the plurality of gear elements.

The present invention will now be described in detail by means of the preferred embodiments illustrated in the accompanying drawings. The embodiments are only illustrative and should not be construed as to limit the ambit or scope of the invention in any way.

FIG. 1 of the accompanying drawing illustrates a preferred embodiment of the transmission system; the transmission system being generally referenced in the FIG. 1 by numeral 100. The transmission system 100 comprises a first set of plurality of input shafts 110 and a second set of plurality of input shafts 116. The first set of plurality of input shafts 110 comprises three input shafts, viz., 110*a*, 110*b* & 110*c*, disposed one within the other in a concentric manner such that the inner shafts extend with respect to the outer shafts to expose a portion of each of the input shafts, so to say, the input shaft 110*b* extends beyond the input shaft 110*a*, and the input shaft 110*c* extends beyond the input shaft 110*b*. Likewise, the second set of plurality of input shafts 116 also comprises three input shafts, viz., 116*a*, 116*b* & 116*c*, disposed one within the other in a concentric manner such that the inner shafts extend with respect to the outer shafts to expose a portion of each of the input shafts, so to say, the input shaft 116*b* extends beyond the input shaft 116*a*, and the input shaft 116*c* extends beyond the input shaft 116*b*.

A first clutch means 108 are housed in a first clutch housing 106. Each input shaft from the first set of plurality of input shafts 110 is operatively connected to a clutch in the first clutch means 108. As shown in the embodiment 100, a clutch 108*a* is operatively connected to the input shaft 110*a*, a clutch 108*b* is operatively connected to the input shaft 110*b*, and a clutch 108*c* is operatively connected to the input shaft 110*c*. The first clutch means 108 are configured to connect the first set of plurality of input shafts 110 to a power source (not shown in FIG. 1).

A second clutch means 114 are housed in a second clutch housing 112. Each input shaft from the second set of plurality of input shafts 116 is operatively connected to a clutch in the second clutch means 114. As shown in the embodiment 100, a clutch 114*a* is operatively connected to the input shaft 116*a*, a clutch 114*b* is operatively connected to the input shaft 116*b*, and a clutch 114*c* is operatively connected to the input shaft 116*c*. The second clutch means 114 are configured to connect the second set of plurality of input shafts 116 to the power source (not shown in FIG. 1).

A plurality of input gears 102 are disposed in a spaced-apart parallel disposition on the exposed portions of each of the input shafts of the first set of plurality of input shafts 110. In the preferred embodiment 100, two input gears 102*a* and 102*b* are disposed on the input shaft 110*a*, two input gears 102*c* and 102*d* are disposed on the input shaft 110*b*, and two input gears 102*e* and 102*f* are disposed on the input shaft 110*c*. Each of the input gears 102*a*, 102*b*, 102*c*, 102*d*, 102*e* & 102*f* have a different pitch diameter to allow the different gears.

A first set of dog clutches 124 are disposed on the first set of plurality of input shafts 110; one dog clutch being positioned between the two input gears journaled on each of the input shaft. A dog clutch 124a is positioned between the input gears 102a and 102b on the input shaft 110a. A dog clutch 124b is positioned between the input gears 102c and 102d on the input shaft 110b. A dog clutch 124c is positioned between the input gears 102e and 102f on the input shaft 110c.

A plurality of input gears 104 are disposed in a spaced-apart parallel disposition on the exposed portions of each of the input shafts of the second set of plurality of input shafts 116. In the preferred embodiment 100, two input gears 104a and 104b are disposed on the input shaft 116a, two input gears 104c and 104d are disposed on the input shaft 116b, and two input gears 104e and 104f are disposed on the input shaft 116c. Each of the input gears 104a, 104b, 104c, 104d, 104e & 104f have a different pitch diameter to allow the different gears.

A second set of dog clutches 126 are disposed on the second set of plurality of input shafts 116; one dog clutch being positioned between the two input gears journaled on each of the input shaft. A dog clutch 126a is positioned between the input gears 104a and 104b on the input shaft 116a. A dog clutch 126b is positioned between the input gears 104c and 104d on the input shaft 116b. A dog clutch 126c is positioned between the input gears 104e and 104f on the input shaft 116c. The dog clutches are adapted to lock the input shafts in position.

The first set of plurality of input shafts 110 and the second set of plurality of input shafts 116 are disposed in a spaced-apart substantially parallel configuration. An output shaft 118 is positioned substantially parallel between the first set of plurality of input shafts 110 and the second set of plurality of input shafts 116. A plurality of drive gears 120 are provided in spaced parallel disposition on the output shaft 118. Each of the drive gear is configured to operatively engage in drive relation with two input gears. The drive gears 120 are fixedly attached on the output shaft 118. A drive gear 120a operatively engages in drive relation with the input gear 102a on the input shaft 110a and the input gear 104a on the input shaft 116a. A drive gear 120b operatively engages in drive relation with the input gear 102b on the input shaft 110a and the input gear 104b on the input shaft 116a. A drive gear 120c operatively engages in drive relation with the input gear 102c on the input shaft 110b and the input gear 104c on the input shaft 116b. A drive gear 120d operatively engages in drive relation with the input gear 102d on the input shaft 110b and the input gear 104d on the input shaft 116b. A drive gear 120e operatively engages in drive relation with the input gear 102e on the input shaft 110c and the input gear 104e on the input shaft 116c. A drive gear 120f operatively engages in drive relation with the input gear 102f on the input shaft 110c and the input gear 104f on the input shaft 116c. Each of the drive gears 120 have a different pitch diameter.

The drive gears 120 are configured to transmit power to the output shaft 118 from the input shafts (110 & 116) via the input gears (102 & 104). An additional clutch means 122 is provided at one end of the output shaft 118 for selectively engaging and disengaging the transmission system 100 with a set of wheels.

The preferred embodiment 100 of the present invention comprises six gears on each set of the plurality of input shafts (110 & 116). In the embodiment 100, on the first set of the plurality of input shafts 110, the first gear and the fourth gear are provided by the input gears 102a and 102b on the input shaft 110a, the second gear and the fifth gear are provided by the input gears 102c and 102d on the input shaft 110b, and the third gear and the sixth gear are provided by the input gears 102e and 102f on the input shaft 110c. Likewise, on the second set of the plurality of input shafts 116, the first gear and the fourth gear are provided by the input gears 104a and 104b on the input shaft 116a, the second gear and the fifth gear are provided by the input gears 104c and 104d on the input shaft 116b, and the third gear and the sixth gear are provided by the input gears 104e and 104f on the input shaft 116c.

This arrangement provides for a quick upshift or downshift of the gears. The plurality of input shafts (110, 116) are not always operatively connected to the plurality of input gears (102, 104), instead the plurality of input shafts (110, 116) and the plurality of input gears (102, 104) are selectively engaged by means of the dog clutches (124 & 126), respectively.

The first set of the plurality of input shafts 110 are operatively connected to the power source through the first clutch means 108, and further operatively connect with the output shaft 118 via the drive gears 120 through the input gears 102. Similarly, the second set of the plurality of input shafts 116 are operatively connected to the power source through the second clutch means 114, and further operatively connect with the output shaft 118 via the drive gears 120 through the input gears 104. Typically, the two sets of the plurality of input shafts, viz., 110 & 116, are operatively connected to different power sources. The preferred embodiment 100 provides independent coupling of the power sources to the output shaft 118. Alternatively, in addition to the two sets of the plurality of input shafts, the present embodiment can be further extended to include a third set of plurality of input shafts and a fourth set of plurality of input shafts if additional power sources are included.

When the power source (not shown in the FIG. 1) is to be engaged with the output shaft 118 in the first gear, the dog clutch 124a locks the input gear 102a, so that the input shaft 110a is locked with the input gear 102a and the clutch 108a is pushed against the first clutch housing 106, thereby, transmitting power from the power source to the input shaft 110a via the clutch 108a. This power is further transmitted to the output shaft 118 via the dog clutch 124a, the input gear 102a and the drive gear 120a, thereby obtaining power from the internal combustion engine in the first gear.

As the dog clutch 124a locks with the input gear 102a, the dog clutches 124b & 124c consequently engage with the input gears 102c & 102e, respectively, thereby preparing the transmission system 100 for instant upshifts to the second and the third gears. To obtain the upshift from the first gear to the second gear, the clutch 108a is disengaged and the clutch 108b is engaged. Alternatively, to upshift from the first gear to the third gear, the clutch 108a is disengaged and the clutch 108c is engaged.

While the vehicle is running on the second gear (engaged with the input gear 102c and the clutch 108b), the dog clutches 124a & 124c remain locked with the input gears 102a & 102e, respectively. Thus, enabling instant upshift to the third gear or downshift to the first gear by engaging with the respective clutch. Similarly, while the vehicle is running on the third gear (engaged with the input gear 102e and the clutch 108c), the dog clutch 124c is locked with the input gear 102e to transmit power to the output shaft 118. The dog clutch 124b remains locked with the input gear 102c to allow for instant downshift to the second gear. Also, the dog clutch 124a disengages from the input gear 102a and engages with the input gear 102b, thereby locking the input shaft 110a with the input gear 102b, and preparing the transmission system 100 for the fourth gear while the car is running in the third gear.

Similarly, the transmission system 100 can be operated over the fourth, fifth and sixth gears. While the vehicle is running on the fourth gear, the dog clutches 124b & 124c also engage the fifth gear and the third gear, respectively, while only the clutch 108a is engaged. While the vehicle is running on the fifth gear, the dog clutches 124a & 124c also engage the fourth gear and the sixth gear, respectively, while only the clutch 108b is engaged. While the vehicle is running on the sixth gear, the dog clutches 124a & 124b also engage the fourth gear and the fifth gear, respectively, while only the clutch 108c is engaged.

The second set of the plurality of input shafts 116, the input gears 104, the dog clutches 126, and the second clutch means 114 operate similarly. Hence, the arrangement provides for instant upshift as well as downshift of the gears.

The preferred embodiment illustrates a transmission system 100 with six gears. However, other different specifications may be possible. Also, the arrangement of the gears can be altered as per the vehicle's preference. The transmission system 100 is adapted to operate with different power sources independently, thus providing complete flexibility to run, for example, the internal combustion engine or the electric motor, at different speeds and optimum efficiency. Also, the system 100 can be partially implemented for an internal combustion engine transmission or an electric motor transmission. Additionally, in accordance to the present invention multiple such power sources can be simultaneously used to power the vehicle.

Figure 2:
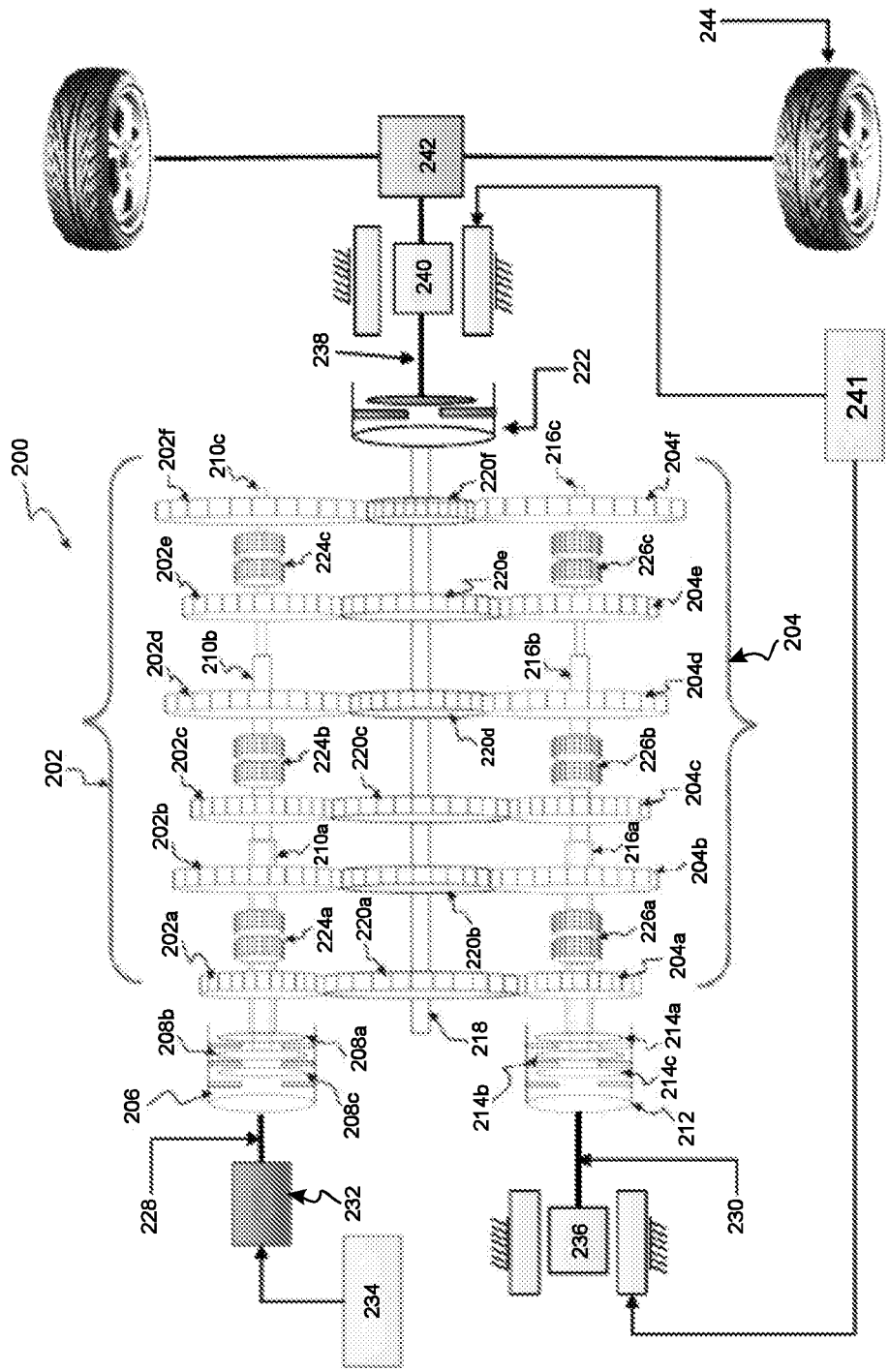
FIG. 2 illustrates a schematic of a preferred arrangement of the transmission system with respect to the engine, the electric motor and one of the drive wheels, in accordance with the present invention.

FIG. 2 of the accompanying drawings shows the preferred embodiment of the FIG. 1 in configuration with an internal combustion engine 232, an electric motor 236, an auxiliary power source 240, a differential arrangement 242 and set of wheels 244; the embodiment being generally referenced in the FIG. 2 by numeral 200. In the embodiment 200, a first set of the plurality of input shafts 210 are provided in operative communication with the internal combustion engine 232 via the first clutch means 208; and the second set of the plurality of input shafts 216 are provided in operative communication with the electric motor 236 via the second clutch means 214. A total of six input gears are provided on the first set of the plurality of input shafts 210, viz.,202a, 202b, 202c, 202d, 202e & 202f, wherein the first gear (input gear 202a) and the fourth gear (input gear 202b) are mounted on the input shaft 210a of the first set of the plurality of input shafts 210, the second gear (input gear 202c) and the fifth gear (input gear 202d) are mounted on the input shaft 210b of the first set of the plurality of input shafts 210, and the third gear (input gear 202e) and the sixth gear (input gear 202f) are mounted on the input shaft 210c of the first set of plurality of input shafts 210. Likewise, a similar arrangement is provided for the assembly of the second set of the plurality of input shafts 216 with the electric motor 236. A total of six input gears are provided on the second set of the plurality of input shafts 216, viz.,204a, 204b, 204c, 204d, 204e & 204f, wherein the first gear (input gear 204a) and the fourth gear (input gear 204b) are mounted on the input shaft 216a of the second set of the plurality of input shafts 216, the second gear (input gear 204c) and the fifth gear (input gear 204d) are mounted on the input shaft 216b of the second set of the plurality of input shafts 216, and the third gear (input gear 204e) and the sixth gear (input gear 204f) are mounted on the input shaft 216c of the second set of plurality of input shafts 216. The first clutch means 208 are housed in the first clutch housing 206, wherein the input shaft 210a is operative connected to the clutch 208a, the input shaft 210b is operatively connected to the clutch 208b, and the input shaft 210c is operatively connected to the clutch 208c. The first set of the plurality of input shafts 210 receive energy from the internal combustion engine 232, which is connected to a fuel tank 234, via the first clutch means 208 by means of an engine shaft 228.

The second clutch means 214 are housed in the second clutch housing 212, wherein the input shaft 216a is operative connected to the clutch 214a, the input shaft 216b is operatively connected to the clutch 214b, and the input shaft 216c is operatively connected to the clutch 214c. The second set of the plurality of input shafts 216 receive energy from the electric motor 236 via the second clutch means 214 by means of a motor shaft 230. The battery is indicated by numeral 241.

A first set of dog clutches 224a, 224b & 224c are disposed on the input shafts 210a, 210b & 210c of the first set of plurality of input shafts 210, respectively. A second set of dog clutches 226a, 226b & 226c are disposed on the input shafts 216a, 216b & 216c of the second set of plurality of input shafts 216, respectively. The working of the dog clutches 224 & 226 is as described for the embodiment 100.

The input gears 202a, 202b, 202c, 202d, 202e &202f of the first set of the plurality of input shafts 210 are provided in operative communication with drive gears 220a, 220b, 220c, 220d, 220e & 220f, respectively, of an output shaft 218. The input gears 204a, 204b, 204c, 204d, 204e & 204f of the second set of the plurality of input shafts 216 are provided in operative communication with the drive gears 220a, 220b, 220c, 220d, 220e & 220f, respectively, of the output shaft 218. Both the sides, i.e. the operation of the first set of the plurality of input shafts 210 by the internal combustion engine 232 and the second set of the plurality of input shafts 216 by the electric motor 236 are similar as described for the preferred embodiment 100 above. However, both these sides are adapted to operate individually.

In the embodiment 200, the power from the internal combustion engine 232 and the electric motor 236 are combined at the output shaft 218. An additional clutch means 222 is provided in operative communication with the output shaft 218. The additional clutch means 222 is adapted to engage or disengage the transmission. The additional clutch means 222 is further connected to an end shaft 238. An auxiliary power source 240 is operatively connected to the end shaft 238, such that, when the transmission system operates, power from the auxiliary power source 240 is always transmitted to the set of wheels 244. Hence, when the additional clutch means 222 engages the transmission, power from both, the transmission and the auxiliary power source 240, are conveyed to the set of wheels 244 via the differential arrangement 242 provided along the end shaft 238; and when the additional clutch means 222 disengages the transmission, power from only the auxiliary power source 240 is conveyed to the set of wheels 244 via the differential arrangement 242. The auxiliary power source 240 is typically a second electric motor. The construction of the second electric motor can be similar to that of the electric motor 236. By this arrangement the vehicle can run as a series-hybrid, series-parallel hybrid or a parallel-hybrid.

Figure 3:
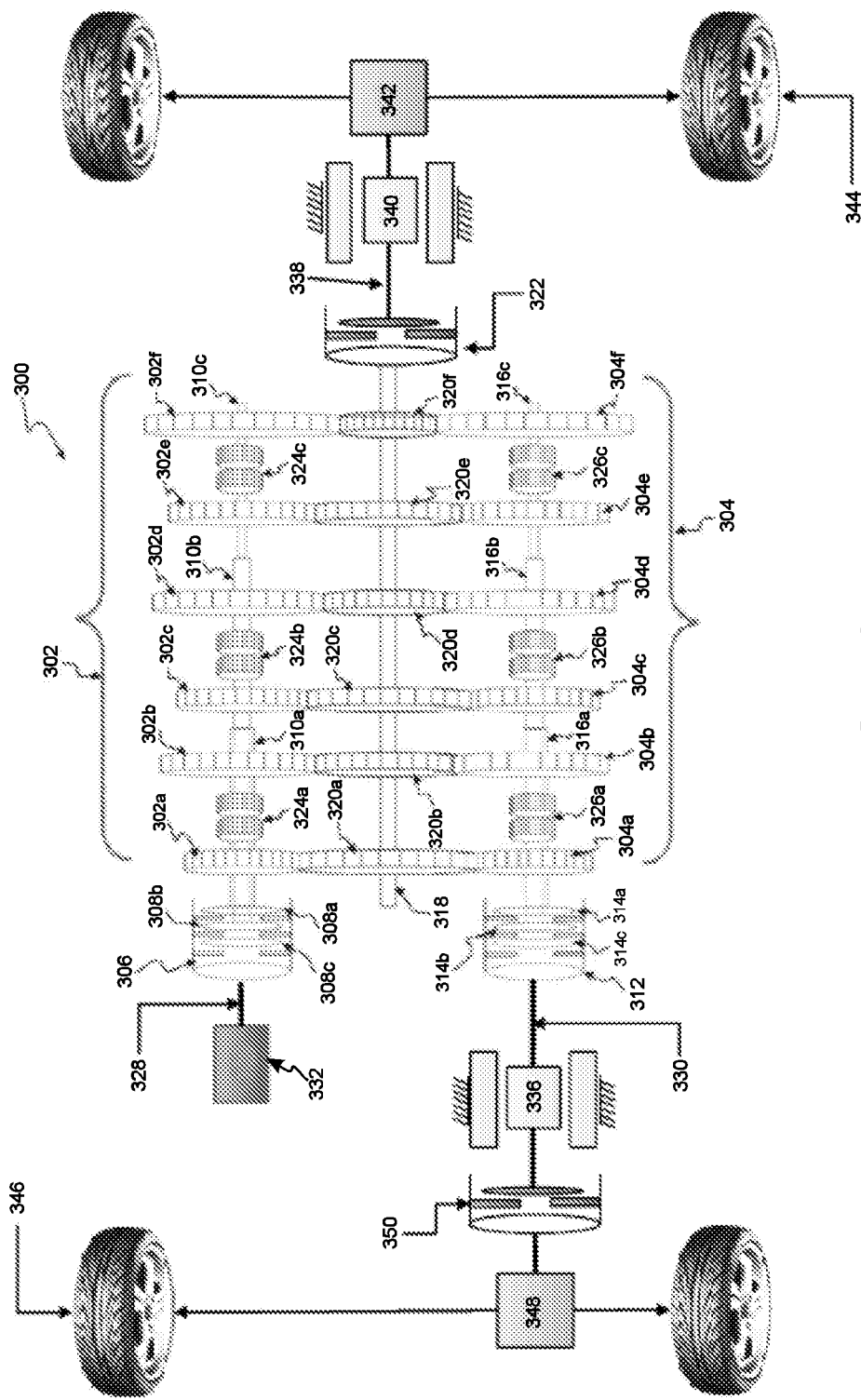
FIG. 3 illustrates a schematic of another preferred arrangement of the transmission system in an all-wheel drive operation, in accordance with the present invention.

FIG. 3 of the accompanying drawings shows the preferred embodiment of the FIG. 1 in configuration with an internal combustion engine 332, an electric motor 336, an auxiliary power source 340, a differential arrangements 342 & 348 and set of wheels 344 & 346; the all-wheel drive embodiment being generally referenced in the FIG. 3 by numeral 300. In the embodiment 300, a first set of the plurality of input shafts 310 are provided in operative communication with the internal combustion engine 332 via the first clutch means 308; and the second set of the plurality of input shafts 316 are provided in operative communication with the electric motor 336 via the second clutch means 314. A total of six input gears are provided on the first set of the plurality of input shafts 310, viz.,302a, 302b, 302c, 302d, 302e & 302f, wherein the first gear (input gear 302a) and the fourth gear (input gear 302b) are mounted on the input shaft 310a of the first set of the plurality of input shafts 310, the second gear (input gear 302c) and the fifth gear (input gear 302d) are mounted on the input shaft 310b of the first set of the plurality of input shafts 310, and the third gear (input gear 302e) and the sixth gear (input gear 302f) are mounted on the input shaft 310c of the first set of plurality of input shafts 310. Likewise, a similar arrangement is provided for the assembly of the second set of the plurality of input shafts 316 with the electric motor 336. A total of six input gears are provided on the second set of the plurality of input shafts 316, viz.,304a, 304b, 304c, 304d, 304e & 304f, wherein the first gear (input gear 304a) and the fourth gear (input gear 304b) are mounted on the input shaft 316a of the second set of the plurality of input shafts 316, the second gear (input gear 304c) and the fifth gear (input gear 304d) are mounted on the input shaft 316b of the second set of the plurality of input shafts 316, and the third gear (input gear 304e) and the sixth gear (input gear 304f) are mounted on the input shaft 316c of the second set of plurality of input shafts 316.

The first clutch means 308 are housed in the first clutch housing 306, wherein the input shaft 310a is operative connected to the clutch 308a, the input shaft 310b is operatively connected to the clutch 308b, and the input shaft 310c is operatively connected to the clutch 308c. The first set of the plurality of input shafts 310 receive energy from the internal combustion engine 332 via the first clutch means 308 by means of an engine shaft 328.

The second clutch means 314 are housed in the second clutch housing 312, wherein the input shaft 316a is operative connected to the clutch 314a, the input shaft 316b is operatively connected to the clutch 314b, and the input shaft 316c is operatively connected to the clutch 314c. The second set of the plurality of input shafts 316 receive energy from the electric motor 336 via the second clutch means 314 by means of a motor shaft 330.

A first set of dog clutches 324a, 324b & 324c are disposed on the input shafts 310a, 310b & 310c of the first set of plurality of input shafts 310, respectively. A second set of dog clutches 326a, 326b & 326c are disposed on the input shafts 316a, 316b &316c of the second set of plurality of input shafts 316, respectively. The working of the dog clutches 324 & 326 is as described for the embodiment 100.

The input gears 302a, 302b, 302c, 302d, 302e & 302f of the first set of the plurality of input shafts 310 are provided in operative communication with drive gears 320a, 320b, 320c, 320d, 320e & 320f, respectively, of an output shaft 318. The input gears 304a, 304b, 304c, 304d, 304e & 304f of the second set of the plurality of input shafts 316 are provided in operative communication with the drive gears 320a, 320b, 320c, 320d, 320e & 320f, respectively, of the output shaft 318. Both the sides, i.e. the operation of the first set of the plurality of input shafts 310 by the internal combustion engine 332 and the second set of the plurality of input shafts 316 by the electric motor 336 are similar as described for the preferred embodiment 100 above. However, both these sides are adapted to operate individually.

In the embodiment 300, the power from the internal combustion engine 332 and the electric motor 336 are combined at the output shaft 318. An additional clutch means 322 is provided in operative communication with the output shaft 318. The additional clutch means 322 is adapted to engage or disengage the transmission. The additional clutch means 322 is further connected to an end shaft 338. An auxiliary power source 340 is operatively connected to the end shaft 338, such that, when the transmission system operates, power from the auxiliary power source 340 is always transmitted to the first set of wheels 344. Hence, when the additional clutch means 322 engages the transmission, power from both, the transmission and the auxiliary power source 340, are conveyed to the first set of wheels 344 via the first differential arrangement 342 provided along the end shaft 338; and when the additional clutch means 322 disengages the transmission, power from only the auxiliary power source 340 is conveyed to the first set of wheels 344 via the first differential arrangement 342. The auxiliary power source 340 is typically a second electric motor. The construction of the second electric motor can be similar to that of the electric motor 336. By this arrangement the vehicle can run as a series-hybrid or a parallel-hybrid.

The motor shaft 330 extends to also operatively connect the electric motor 336 to a second set of wheels 346 via the second differential arrangement 348. Alternatively, a second end shaft can provide the connection. A clutch unit 350 can be provided to selectively engage or disengage the connection of the electric motor 336 with the second set of wheels 346. In the embodiment 300, the electric motor 336, thus, provides power to both the set of wheels 344 & 346.

Figure 4:
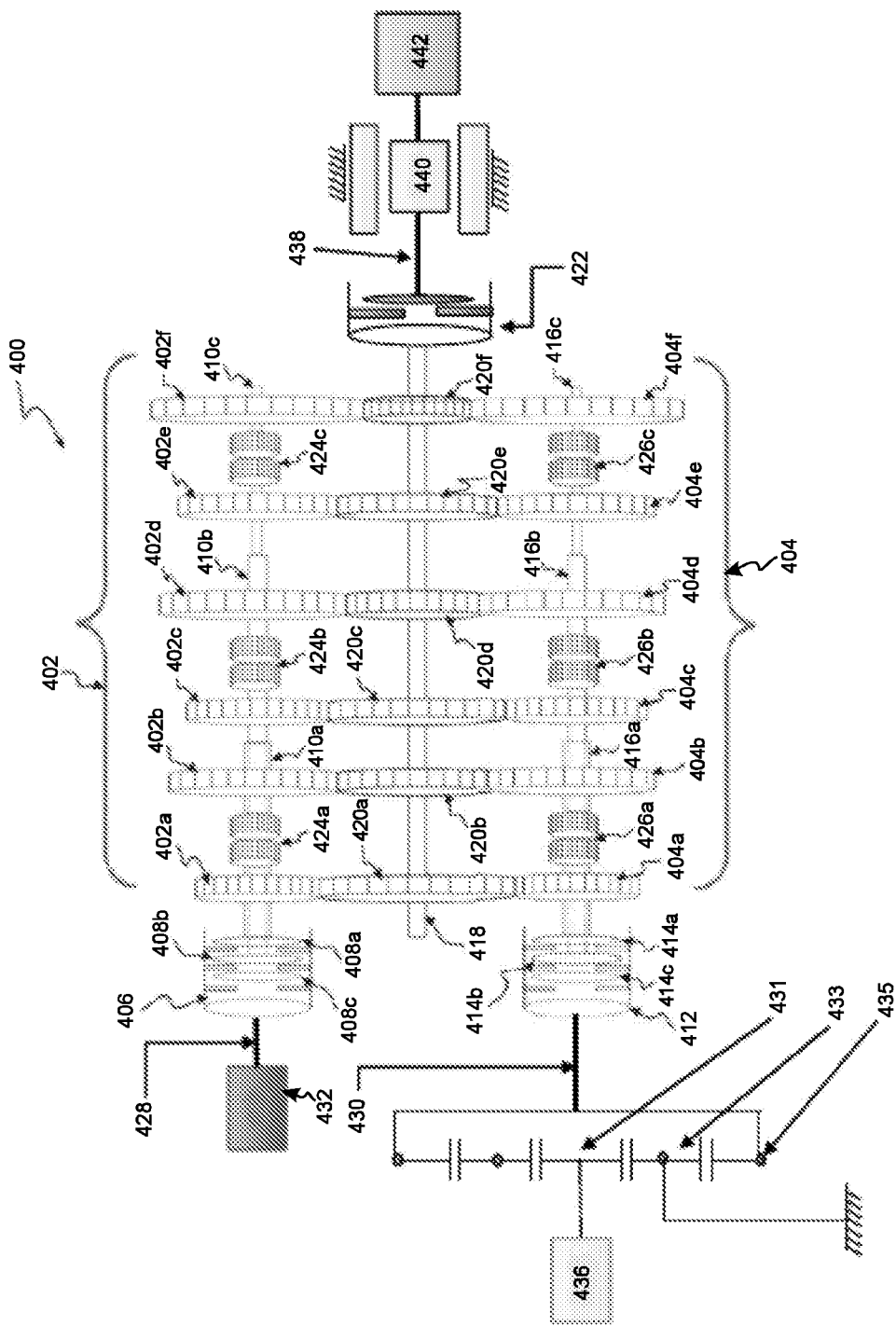
FIG. 4 illustrates a schematic of yet another preferred arrangement of the transmission system using a planetary gear set, in accordance with the present invention.

FIG. 4 of the accompanying drawings shows the preferred embodiment of the FIG. 1 in configuration with an internal combustion engine 432, an electric motor 436, an auxiliary power source 440, a differential arrangement 442 and a planetary gear set; the embodiment being generally referenced in the FIG. 4 by numeral 400. In the embodiment 400, a first set of the plurality of input shafts 410 are provided in operative communication with the internal combustion engine 432 via the first clutch means 408; and the second set of the plurality of input shafts 416 are provided in operative communication with the electric motor 436 via the second clutch means 414. A total of six input gears are provided on the first set of the plurality of input shafts 410, viz.,402a, 402b, 402c, 402d, 402e & 402f, wherein the first gear (input gear 402a) and the fourth gear (input gear 402b) are mounted on the input shaft 410a of the first set of the plurality of input shafts 410, the second gear (input gear 402c) and the fifth gear (input gear 402d) are mounted on the input shaft 410b of the first set of the plurality of input shafts 410, and the third gear (input gear 402e) and the sixth gear (input gear 402f) are mounted on the input shaft 410c of the first set of plurality of input shafts 410. Likewise, a similar arrangement is provided for the assembly of the second set of the plurality of input shafts 416 with the electric motor 436. A total of six input gears are provided on the second set of the plurality of input shafts 416, viz.,404a, 404b, 404c, 404d, 404e & 404f, wherein the first gear (input gear 404a) and the fourth gear (input gear 404b) are mounted on the input shaft 416a of the second set of the plurality of input shafts 416, the second gear (input gear 404c) and the fifth gear (input gear 404d) are mounted on the input shaft 416b of the second set of the plurality of input shafts 416, and the third gear (input gear 404e) and the sixth gear (input gear 404f) are mounted on the input shaft 416c of the second set of plurality of input shafts 416.

The first clutch means 408 are housed in the first clutch housing 406, wherein the input shaft 410a is operative connected to the clutch 408a, the input shaft 410b is operatively connected to the clutch 408*b*, and the input shaft 410*c* is operatively connected to the clutch 408*c*. The first set of the plurality of input shafts 410 receive energy from the internal combustion engine 432 via the first clutch means 408 by means of an engine shaft 428.

The second clutch means 414 are housed in the second clutch housing 412, wherein the input shaft 416*a* is operative connected to the clutch 414*a*, the input shaft 416*b* is operatively connected to the clutch 414*b*, and the input shaft 416*c* is operatively connected to the clutch 414*c*. The second set of the plurality of input shafts 416 receive energy from the electric motor 436 via the second clutch means 414 by means of a motor shaft 430.

A first set of dog clutches 424*a*, 424*b* & 424*c* are disposed on the input shafts 410*a*, 410*b* & 410*c* of the first set of plurality of input shafts 410, respectively. A second set of dog clutches 426*a*, 426*b* & 426*c* are disposed on the input shafts 416*a*, 416*b* & 416*c* of the second set of plurality of input shafts 416, respectively. The working of the dog clutches 424 & 426 is as described for the embodiment 100.

The input gears 402*a*, 402*b*, 402*c*, 402*d*, 402*e* & 402*f* of the first set of the plurality of input shafts 410 are provided in operative communication with drive gears 420*a*, 420*b*, 420*c*, 420*d*, 420*e* & 420*f*, respectively, of an output shaft 418. The input gears 404*a*, 404*b*, 404*c*, 404*d*, 404*e* & 404*f* of the second set of the plurality of input shafts 416 are provided in operative communication with the drive gears 420*a*, 420*b*, 420*c*, 420*d*, 420*e* & 420*f*, respectively, of the output shaft 418. Both the sides, i.e. the operation of the first set of the plurality of input shafts 410 by the internal combustion engine 432 and the second set of the plurality of input shafts 416 by the electric motor 436 are similar as described for the preferred embodiment 100 above. However, both these sides are adapted to operate individually.

In the embodiment 400, the power from the internal combustion engine 432 and the electric motor 436 are combined at the output shaft 418. An additional clutch means 422 is provided in operative communication with the output shaft 418. The additional clutch means 422 is adapted to engage or disengage the transmission. The additional clutch means 422 is further connected to an end shaft 438. An auxiliary power source 440 is operatively connected to the end shaft 438, such that, when the transmission system operates, power from the auxiliary power source 440 is always transmitted to the first set of wheels (not shown in figure). Hence, when the additional clutch means 422 engages the transmission, power from both, the transmission and the auxiliary power source 440, are conveyed to the first set of wheels via the first differential arrangement 442 provided along the end shaft 438; and when the additional clutch means 422 disengages the transmission, power from only the auxiliary power source 440 is conveyed to the first set of wheels via the first differential arrangement 442. The auxiliary power source 440 is typically a second electric motor. The construction of the second electric motor can be similar to that of the electric motor 436. By this arrangement the vehicle can run as a series-hybrid or a parallel-hybrid.

In the embodiment 400, the planetary gear set is provided between the electric motor 436 and the second clutch means 414 along the motor shaft 430. The embodiment 400 is suitable with high speed electric motors. The electric motor 436 is operatively connected to a sun gear 431 of the planetary gear set. The planet carrier of the planetary gear set 433 is held stationary, and the ring gear 435 is operatively connected to the motor shaft 430. As discussed above, the motor shaft 430 connects to the second set of the plurality of input shafts 416 through the second clutch means 414. Hence, the power from the electric motor 436 is transmitted to the transmission system via the planetary gear set. In a similar manner, a planetary gear set may also be provided with the auxiliary power source 440.

Figure 5:
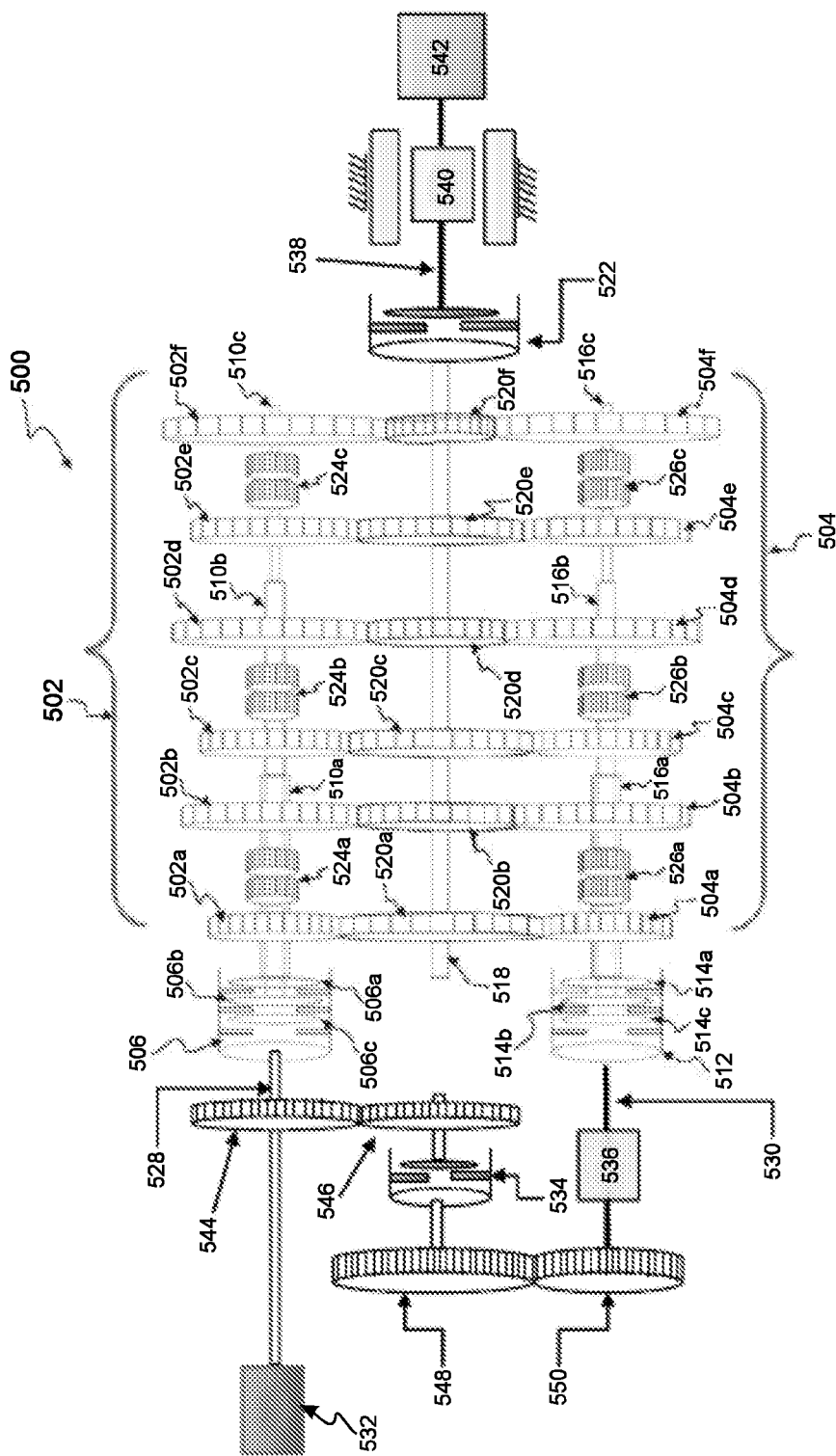
FIG. 5 illustrates a schematic of still another preferred arrangement of the transmission system using a plurality of gear elements, in accordance with the present invention.

FIG. 5 of the accompanying drawings shows the preferred embodiment of the FIG. 1 in configuration with an internal combustion engine 532, an electric motor 536, an auxiliary power source 540, a differential arrangement 542 and a plurality of gear elements; the embodiment being generally referenced in the FIG. 5 by numeral 500. In the embodiment 500, a first set of the plurality of input shafts 510 are provided in operative communication with the internal combustion engine 532 via the first clutch means 508; and the second set of the plurality of input shafts 516 are provided in operative communication with the electric motor 536 via the second clutch means 514. A total of six input gears are provided on the first set of the plurality of input shafts 510, viz.,502*a*, 502*b*, 502*c*, 502*d*, 502*e* & 502*f*, wherein the first gear (input gear 502*a*) and the fourth gear (input gear 502*b*) are mounted on the input shaft 510*a* of the first set of the plurality of input shafts 510, the second gear (input gear 502*c*) and the fifth gear (input gear 502*d*) are mounted on the input shaft 510*b* of the first set of the plurality of input shafts 510, and the third gear (input gear 502*e*) and the sixth gear (input gear 502*f*) are mounted on the input shaft 510*c* of the first set of plurality of input shafts 510. Likewise, a similar arrangement is provided for the assembly of the second set of the plurality of input shafts 516 with the electric motor 536. A total of six input gears are provided on the second set of the plurality of input shafts 516, viz.,504*a*, 504*b*, 504*c*, 504*d*, 504*e* & 504*f*, wherein the first gear (input gear 504*a*) and the fourth gear (input gear 504*b*) are mounted on the input shaft 516*a* of the second set of the plurality of input shafts 516, the second gear (input gear 504*c*) and the fifth gear (input gear 504*d*) are mounted on the input shaft 516*b* of the second set of the plurality of input shafts 516, and the third gear (input gear 504*e*) and the sixth gear (input gear 504*f*) are mounted on the input shaft 516*c* of the second set of plurality of input shafts 516.

The first clutch means 508 are housed in the first clutch housing 506, wherein the input shaft 510*a* is operative connected to the clutch 508*a*, the input shaft 510*b* is operatively connected to the clutch 508*b*, and the input shaft 510*c* is operatively connected to the clutch 508*c*. The first set of the plurality of input shafts 510 receive energy from the internal combustion engine 532 via the first clutch means 508 by means of an engine shaft 528.

The second clutch means 514 are housed in the second clutch housing 512, wherein the input shaft 516*a* is operative connected to the clutch 514*a*, the input shaft 516*b* is operatively connected to the clutch 514*b*, and the input shaft 516*c* is operatively connected to the clutch 514*c*. The second set of the plurality of input shafts 516 receive energy from the electric motor 536 via the second clutch means 514 by means of a motor shaft 530.

A first set of dog clutches 524*a*, 524*b* & 524*c* are disposed on the input shafts 510*a*, 510*b* & 510*c* of the first set of plurality of input shafts 510, respectively. A second set of dog clutches 526*a*, 526*b* &526*c* are disposed on the input shafts 516*a*, 516*b* & 516*c* of the second set of plurality of input shafts 516, respectively. The working of the dog clutches 524 & 526 is as described for the embodiment 100.

The input gears 502*a*, 502*b*, 502*c*, 502*d*, 502*e* &502*f* of the first set of the plurality of input shafts 510 are provided in operative communication with drive gears 520*a*, 520*b*, 520*c*, 520*d*, 520*e* & 520*f*, respectively, of an output shaft 518. The input gears 504*a*, 504*b*, 504*c*, 504*d*, 504*e* & 504*f* of the second set of the plurality of input shafts 516 are provided in operative communication with the drive gears 520*a*, 520*b*, 520*c*, 520*d*, 520*e* & 520*f*, respectively, of the output shaft 518. Both the sides, i.e. the operation of the first set of the plurality of input shafts 510 by the internal combustion engine 532 and the second set of the plurality of input shafts 516 by the electric motor 536 are similar as described for the preferred embodiment 100 above. However, both these sides are adapted to operate individually.

In the embodiment 500, the power from the internal combustion engine 532 and the electric motor 536 are combined at the output shaft 518. An additional clutch means 522 is provided in operative communication with the output shaft 518. The additional clutch means 522 is adapted to engage or disengage the transmission. The additional clutch means 522 is further connected to an end shaft 538. An auxiliary power source 540 is operatively connected to the end shaft 538, such that, when the transmission system operates, power from the auxiliary power source 540 is always transmitted to the first set of wheels (not shown in figure). Hence, when the additional clutch means 522 engages the transmission, power from both, the transmission and the auxiliary power source 540, are conveyed to the first set of wheels via the first differential arrangement 542 provided along the end shaft 538; and when the additional clutch means 522 disengages the transmission, power from only the auxiliary power source 540 is conveyed to the first set of wheels via the first differential arrangement 542. The auxiliary power source 540 is typically a second electric motor. The construction of the second electric motor can be similar to that of the electric motor 536. By this arrangement the vehicle can run as a series-hybrid or a parallel-hybrid.

The embodiment 500 is suitable with high speed electric motors. The plurality of gear elements, including a set of gear wheels, are provided in operative communication with the internal combustion engine 532 and the electric motor 536. A first gear wheel 544 is mounted on the engine shaft 528. The first gear wheel 544 is connected to a second gear wheel 546 by means of a gear tooth arrangement. The second gear wheel 546 is operatively connected to a clutch unit 534, and the clutch unit 534 is operatively connected to a third gear wheel 548. Again, the third gear wheel 548 is connected to a fourth gear wheel 550 by means of a gear tooth arrangement. The fourth gear wheel 550 is connected to the motor shaft 530 such that the fourth gear wheel 550 and the motor shaft 530 rotate at the same rpm and the torque from the fourth gear wheel 550 is transferred to the motor shaft 530.

The transmission system works as a 6-speed transmission for the internal combustion engine and a 6-speed transmission for the electric motor. However, with the addition of the gear wheels 544, 546, 548 & 550 along with the clutch unit 534 the transmission system can be driven as a 12-speed transmission for the internal combustion engine alone. While the transmission is driven as 12-speed transmission for the internal combustion engine, it can continue to work as 6 speed transmission for the electric motor. This feature is especially designed for adapting the transmission for use in the heavy vehicles such as buses and trailers. The power is transmitted from the internal combustion engine to the transmission (as discussed above), the gear wheels 544, 546, 548 & 550, the clutch unit 534 and the motor shaft 530, where the input gears 502 mounted on the first set of the plurality of input shafts 510 define the first six gears for the internal combustion engine, and the input gears 504 mounted on the second set of the plurality of input shafts 516 define the seventh to twelve gears for the internal combustion engine. When the clutch unit 534 is disengaged then one of the first six gears on input shafts 510 are engaged to drive the vehicle. But when the clutch unit 534 is engaged then the first clutch means 508 are disengaged. The power from the internal combustion engine 532 and the electric motor 536 is transmitted to the second clutch means 514 by means of motor shaft 530. One of the input gears mounted on the input shafts 516*a*, 516*b* and 516*c* is selected and the respective clutch is engaged.

Modes of Operation Using the Embodiment 200:

The Vehicle Being Driven by the Internal Combustion Engine:

The vehicle is driven by the internal combustion engine 232 by engaging a respective clutch means 208, input shaft 210, and input gear 202. Based on the power required, one of the first clutch means 208 and the respective input gear are engaged so that the torque is transmitted from the internal combustion engine 232 to the output shaft 218. The additional clutch means 222 is also engaged in order to transmit the power from the output shaft 218 to the end shaft 238, the differential arrangement 242 and the front drive wheels 244. The electric motor 236 is not used in this mode of operation. In a situation where the batteries are drained, the vehicle can be run solely by the internal combustion engine 232.

The Vehicle Being Driven and Charged by the Internal Combustion Engine:

In this mode of operation, the power from the internal combustion engine 232 is split for charging the batteries 241 as well as driving the vehicle. The power from the internal combustion engine 232 is delivered to the output shaft 218 as discussed in the earlier mode of operation. The additional clutch means 222 is also engaged in order to transfer the torque to the end shaft the end shaft 238, the differential arrangement 242 and the front drive wheels 244. The electric motor 236 operates the second set of plurality of input shafts 216. The electric motor 236 acts as a generator for charging the batteries. The power from the internal combustion engine 232 is transmitted via the input shafts 210, the output shaft 218 and the input shaft 216 to the electric motor-generator 236.

The Vehicle Being Charged by the Internal Combustion Engine:

In this mode of operation, the vehicle is standstill. Hence, the end shaft 238 does not rotate. The internal combustion engine 232 drives the first clutch means 206. The working of the input gears and the dog clutches is described above. The torque from the internal combustion engine 232 is transmitted to the output shaft 218 via the respective drive gears. This torque is further transmitted to the input shafts 216 by engaging the respective input gears 204. Based on the gear selected, the respective clutch also gets engaged in the second clutch means 214. The additional clutch means 222 is disengaged in this mode of operation. Hence, the torque from the internal combustion engine 232 is transferred only to the electric motor 236. The electric motor 236 is used to charge the batteries.

The Vehicle Being Driven by the Electric Motors:

In this mode of operation, the clutches in the first clutch means 208 are not engaged. Hence, there is no power transmitted by the internal combustion engine 232, and the internal combustion engine 232 is completely shut-off. The vehicle is driven by the auxiliary power source 240 or by both the electric motor 236 and the auxiliary power source 240.

If the vehicle is driven by the auxiliary power source 240 alone then the additional clutch means 222 is disengaged.

Hence, the transmission is completely disconnected from the end shaft 238. The electric motor 236 is not operational in this case. The end shaft 238 is driven by the auxiliary power source 240 alone, which further drives the differential arrangement 242 and the front drive wheels 244.

If the vehicle is driven by the electric motor 236 and the auxiliary power source 240 then the additional clutch means 222 remains engaged. Thus, the transmission is engaged with the end shaft 238. The input shafts 204, the respective input gear and the clutch are engaged. The power from the electric motor 236 is transferred to the output shaft 218, which is further transmitted to the differential arrangement 242 and the front drive wheels 244 along with the power from the auxiliary power source 240.

The Vehicle Being Driven as Parallel-hybrid:

In this mode of operation, the power is delivered by the internal combustion engine 232, the electric motor 236, and the auxiliary power source 240. The power from the internal combustion engine 232 and the electric motor 236 is transferred to the output shaft 218 as discussed above. The power from the internal combustion engine 232 and the electric motor 236 is combined. The additional clutch means 222 is engaged transferring this power to the end shaft 238. The power from the auxiliary power source 240 is transferred on the end shaft 238. Thus, the end shaft 238 combines power from all the three power sources, and transfers the same to the front drive wheels 244 via the differential arrangement 242.

The Vehicle Being Driven as Series-parallel Hybrid:

In this mode of operation, the power of the internal combustion engine 232 is split in different gear ratios for charging the batteries and driving the vehicle. The electric motor-generator 236 acts as the generator and charges the batteries. The electric motor-generator 240 acts as the motor. The electric motor-generator 240 draws electric current from the battery 241 and drives the vehicle. The power from the internal combustion engine 232 is transferred to the output shaft 218. The additional clutch means 222 is engaged. Also, the side with the electric motor-generator 236 is functional. The power is split at the output shaft 218 between the front drive wheels 244 and the electric motor-generator 236. Since, the additional clutch means 222 is engaged, the end shaft 238 receives power from the output shaft 218 and in turn from the internal combustion engine 232. The end shaft 238 also receives power from the electric motor-generator 240. Thus, power from the internal combustion engine 232 and the electric motor-generator 240 is combined at the end shaft 238 and delivered to the front drive wheels 244 via the differential arrangement 242. The power from the internal combustion engine 232 transmitted to the electric motor-generator 236 drives electric motor-generator 236 in order to generate electricity. The electric motor-generator 236 thus charges the battery 241 while electric motor-generator 240 discharges the battery for driving the vehicle. This way the transmission can work as series-parallel hybrid transmission.

The Vehicle Being Driven as Series-hybrid:

In this mode of operation, the additional clutch means 222 is disengaged. Thus, the end shaft 238 can rotate independently of the output shaft 218. The power from the electric motor-generator 240 is transferred to the end shaft 238. Thus, electric motor-generator 240 drives the front drive wheels 244 via the differential arrangement 242. The power from the internal combustion engine 232 is transferred to the output shaft 218. The power from the internal combustion engine 232 is also transferred to the electric motor-generator 236. The electric motor-generator 236 acts as generator and charges the batteries. Thus, the internal combustion engine 232 drives the electric motor-generator 236, which charges the batteries; and the electric motor-generator 240 draws the electrical energy from the battery 241 to drive the vehicle. Hence, the vehicle operates as a series-hybrid.

Regenerative Braking Mode:

Regenerative braking can be achieved by converting mechanical energy from the movement of the vehicle into electrical energy. The electric motors are used as generators in this mode. One or both of the motors 236 & 240 can be used to convert the mechanical energy to electrical energy. If the second electric motor 240 alone is used as generator, then the additional clutch means 222 is disengaged. This will disconnect the transmission from the end shaft 238. Thus, the differential arrangement 242 drives only the end shaft 238. Hence, the electric motor-generator 240 charges the battery while the first electric motor 236 is idle.

When the additional clutch means 222 is engaged, the torque from the movement of the vehicle is transmitted via the end shaft 238 to the output shaft 218, and thereby to transmission. Hence, the internal combustion engine 232 is shut-off. Thus, the mechanical energy is transferred to the first electric motor 236. Hence, the first electric motor 236 and electric motor-generator 240 both act as generator and charge the batteries.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

Embodiments of the present invention are applicable over a wide number of uses and other embodiments may be developed beyond the embodiments discussed heretofore. Only the most preferred embodiments and their uses have been described herein for purpose of example, illustrating the advantages over the prior art obtained through the present invention; the invention is not limited to these specific embodiments or their specified uses. Thus, the forms of the invention described herein are to be taken as illustrative only and other embodiments may be selected without departing from the scope of the present invention. It should also be understood that additional changes and modifications, within the scope of the invention, will be apparent to one skilled in the art and that various modifications to the construction described herein may fall within the scope of the invention.

The invention claimed is:

1. A transmission system for a hybrid vehicle, the transmission system comprising:
   at least two sets of input shafts each set having a plurality of input shafts, wherein each of the at least two set of input shafts is configured for receiving power from a different power source, the plurality of input shafts being concentrically disposed one within the other with each of the inner shafts extending with respect to the corresponding outer shaft to expose at least a portion of each of the input shafts;
   at least two sets of connecting means with one set of connecting means provided at one end of each of the at least two sets of input shafts for selectively connecting one of the corresponding input shafts to the corresponding power source;
   an output shaft operatively coupled with the plurality of input shafts of each of the at least two sets of input shafts for conveying a power output from the transmission;
   at least two sets of input gears, there being one set of input gears for each of the at least two sets of input shafts, each set comprising a plurality of input gears arranged in spaced parallel disposition on and operatively coupled to the exposed portion of each of the input shafts, each of the input gears of a set of input gears out of the at least two sets of input gears having a different pitch diameter for constituting a different transmission gear ratios; and
   plurality of drive gears arranged in spaced parallel disposition on the output shaft and operatively engaged in drive relation with the plurality of input gears belonging to each of the at least two sets of input gears, the drive gears being configured to transmit power to the output shaft from the input shafts by means of the corresponding input gears,
   wherein the at least two sets of connecting means engage input shafts from more than one set of the at least two sets of input shafts to enable simultaneous power transfer to the output shaft from more than one power source in parallel disposition.

2. The transmission system as claimed in claim 1, wherein the power source includes at least one source selected from internal combustion engine, electric motor, fuel cell, compressed air engine, high mass flywheel, and the like.

3. The transmission system as claimed in claim 1, wherein selection of input shafts belonging to different sets out of at least two sets of input shafts that are connected to the corresponding power sources enables transmission of power from different sources to the output shaft at different gear ratios.

4. The transmission system as claimed in claim 1, wherein at least one of the plurality of input shafts of the at least two sets of input shaft has journalled thereon more than one input gears having different pitch diameters; and wherein the transmission system further comprises at least one dog clutch means disposed on the exposed portion of the input shafts having journalled input gears to operatively couple the journalled input gears to the corresponding input shaft in a selective manner.

5. The transmission system as claimed in claim 4, wherein, at least two of the plurality of input shafts of a set of input shafts have journalled thereon more than one input gears having different pitch diameters, and the transmission system comprises at least two dog clutch means disposed on the exposed portion of the input shafts having journalled input gears; and wherein when power is transmitted through any of the plurality of input shafts belonging to a set of input shafts to any of its respective input gear, the at least two dog clutch means are adapted to lock at least two input shafts with their respective input gears thereby preparing the transmission system for a consecutive gear shift through the respective connecting means.

6. The transmission system as claimed in claim 1, wherein each of the at least two sets of connecting means for selectively connecting of the corresponding input shafts to the corresponding power source comprises a set of plurality of clutches, each clutch configured to independently couple the corresponding power source to one of the plurality of input shafts of the corresponding set of input shafts.

7. A hybrid vehicle configured to run on at least two different power sources, the hybrid vehicle comprising:
   at least two power sources,
   a first sets of wheels;
   a second set of wheels;
   a transmission system comprising:
      at least two sets of input shafts each set having a plurality of input shafts, wherein each set of input shafts is configured for receiving power from a different power source out of the at least two power sources, the plurality of input shafts being concentrically disposed one within the other with each of the inner shafts extending with respect to the corresponding outer shaft to expose at least a portion of each of the input shafts;
      at least two sets of connecting means with one set of connecting means provided at one end of each of the at least two sets of input shafts for selectively connecting one of the corresponding input shafts to the corresponding power source;
      an output shaft operatively coupled with the plurality of input shafts of each of the at least two sets of input shafts for conveying a power output from the transmission;
      at least two sets of input gears, there being one set of input gears for each set of input shafts, each of the at least two sets of input gears comprising a plurality of input gears arranged in spaced parallel disposition on and operatively coupled to the exposed portion of each of the input shafts, each of the input gears of a set of input gears out of the at least two sets of input gears having a different pitch diameter for constituting a different transmission gear ratios; and
      plurality of drive gears arranged in spaced parallel disposition on the output shaft and operatively engaged in drive relation with the plurality of input gears belonging to the at least two sets of input gears, the drive gears being configured to transmit power to the output shaft from the input shafts by means of the input gears,
      wherein the at least two sets of connecting means engage input shafts from more than one set of the at least two sets of input shafts to enable simultaneous power transfer to the output shaft from more than one power sources out of the at least two power sources enabling the hybrid vehicle to work in parallel disposition.

8. The hybrid vehicle as claimed in claim 7, wherein the at least two power sources include any or a combination of internal combustion engine, electric motor, fuel cell, compressed air engine, high mass flywheel, and the like.

9. The hybrid vehicle as claimed in claim 7, wherein selection of input shafts belonging to different sets out of at least two sets of input shafts that are connected to the corresponding power sources enables transmission of power from different sources to the output shaft at different gear ratios.

10. The hybrid vehicle as claimed in claim 7, wherein at least one of the plurality of input shafts of the at least two sets of input shaft has journalled thereon more than one input gears having different pitch diameters; and wherein the transmission system further comprises at least one dog clutch means disposed on the exposed portion of the input shafts having journalled input gears to operatively couple the journalled input gears to the corresponding input shaft in a selective manner.

11. The hybrid vehicle as claimed in claim 10, wherein at least two of the plurality of input shafts have journalled thereon more than one input gears having different pitch diameters, and the transmission system comprises at least two dog clutch means disposed on the exposed portion of the input shafts having journalled input gears; and wherein when power is transmitted through any of the plurality of input shafts belonging to a set of input shafts, to any of its respective input gear, the at least two dog clutch means are adapted to lock at least two input shafts with their respective input gears thereby preparing the transmission for a consecutive gear shift through the respective connecting means.

12. The hybrid vehicle as claimed in claim 7, wherein each of the at least two sets of connecting means for selectively connecting of the corresponding input shafts to the corresponding power source comprises a set of plurality of clutches, each clutch configured to independently couple the corresponding power source to one of the plurality of input shafts of the corresponding set out of the at least two sets of input shafts.

13. The hybrid vehicle as claimed in claim 7, wherein the output shaft is connected to the first set of wheels through a first clutch unit, and the connection from the first clutch unit to the first set of wheels includes an electric motor arranged in series working as an auxiliary power source working in series disposition providing additional power to the first set of wheels.

14. The hybrid vehicle as claimed in claim 13, wherein the first clutch unit enables disconnecting the first set of wheels from the transmission system and powering the first set of wheels directly by the auxiliary power source alone.

15. The hybrid vehicle as claimed in claim 7, wherein the hybrid vehicle further comprises at least one planetary gear set between at least one of the at least two power sources and the corresponding connecting means for adjusting input power to the corresponding set of input shafts.

16. The hybrid vehicle as claimed in claim 7, wherein one of the at least two power sources is an electric motor, and one end of the electric motor is coupled to the corresponding connecting means of the transmission system for transmitting power to the corresponding set of input shafts and other end of the electric motor is coupled to the second set of wheels through a second clutch unit; wherein engaging the second clutch unit as well as the first clutch unit enables the electric motor to drive both the first set of wheels and the second set of wheels.

17. The hybrid vehicle as claimed in claim 7, wherein two different power sources out of the at least two power sources are coupled by a gear train with a third clutch unit in between, wherein coordinated engagement and disengagement of the corresponding connecting means and the third clutch unit enables the transmission system to provide speed reductions that is double the number that is available in the transmission system.

18. The hybrid vehicle as claimed in claim 7, wherein disengaging the first clutch unit and engaging the second clutch unit enables independent power sources to drive the first set of wheels and the second set of wheels.

\* \* \* \* \*